(12) United States Patent
Yin et al.

(10) Patent No.: US 12,462,341 B2
(45) Date of Patent: Nov. 4, 2025

(54) METHOD AND SYSTEM FOR PROCESSING IMAGE

(71) Applicant: SHANGHAI INTEGRATED CIRCUIT MANUFACTURING INNOVATION CENTER CO., LTD., Shanghai (CN)

(72) Inventors: Rui Yin, Shanghai (CN); Min Xu, Shanghai (CN); Wei Zhang, Shanghai (CN); Jian Jin, Shanghai (CN)

(73) Assignee: SHANGHAI INTEGRATED CIRCUIT MANUFACTURING INNOVATION CENTER CO., LTD., Shanghai (CN)

( * ) Notice: Subject to any disclaimer, the term of this patent is extended or adjusted under 35 U.S.C. 154(b) by 956 days.

(21) Appl. No.: 17/583,419

(22) Filed: Jan. 25, 2022

(65) Prior Publication Data

US 2023/0033445 A1 Feb. 2, 2023

(30) Foreign Application Priority Data

Jul. 29, 2021 (CN) .......................... 202110865911.0

(51) Int. Cl.
*G06K 9/00* (2022.01)
*G01S 17/894* (2020.01)
(Continued)

(52) U.S. Cl.
CPC .............. *G06T 5/50* (2013.01); *G01S 17/894* (2020.01); *G06T 5/77* (2024.01); *G06T 7/521* (2017.01);
(Continued)

(58) Field of Classification Search
CPC .. G06T 5/50; G06T 7/55; G06T 7/521; G06T 5/77; G06T 2207/10028;
(Continued)

(56) References Cited

U.S. PATENT DOCUMENTS

2014/0085398 A1* 3/2014 Tian .................. H04N 7/15
348/14.01
2016/0212355 A1* 7/2016 Pouli ................. H04N 5/50
(Continued)

*Primary Examiner* — Avinash Yentrapati
(74) *Attorney, Agent, or Firm* — ZIEGLER IP LAW GROUP, LLC.

(57) ABSTRACT

The present invention provides a method and system for processing an image. The method comprises: acquiring high-frame data and low-frame data of a target object, and acquiring initial exposure time to complete the high-frame data and the low-frame data; calculating a proportion of overexposed pixel points and a proportion of underexposed pixel points in the low-frame data; adjusting the initial exposure time according to a magnitude of the proportion of the overexposed pixel points and a magnitude of the proportion of the underexposed pixel points to obtain target exposure time; and acquiring target high-frame data and target low-frame data according to the target exposure time, and replacing overexposed pixel points in the target high-frame data with pixel points of the target low-frame data. The initial exposure time is adjusted according to the proportion of the overexposed pixel points to obtain the target exposure time, the target high-frame data and the target low-frame data are acquired according to the target exposure time, and the overexposed pixel points in the target high-frame data are replaced with the pixel points of the target low-frame data, thus the quality of a picture is improved.

5 Claims, 2 Drawing Sheets

(51) Int. Cl.
    *G06T 5/50*     (2006.01)
    *G06T 5/77*     (2024.01)
    *G06T 7/521*     (2017.01)
    *G06T 7/55*     (2017.01)
    *H04N 23/72*     (2023.01)

(52) U.S. Cl.
    CPC ............... *G06T 7/55* (2017.01); *H04N 23/72* (2023.01); *G06T 2207/10028* (2013.01); *G06T 2207/10144* (2013.01); *G06T 2207/30168* (2013.01)

(58) Field of Classification Search
    CPC . G06T 2207/10144; G06T 2207/30168; G01S 17/894; H04N 23/72
    See application file for complete search history.

(56) References Cited

U.S. PATENT DOCUMENTS

2022/0137215 A1\*   5/2022   Ono ........................ G01S 17/36
    356/4.01
2022/0239822 A1\*   7/2022   Genov ................. G01S 7/4816

\* cited by examiner

METHOD AND SYSTEM FOR PROCESSING IMAGE

FIELD OF TECHNOLOGY

The present invention relates to the field of photography, and in particular to a method and system for processing an image.

BACKGROUND

At present, 3D visual imaging technology plays an important role in various industries, where Time of Flight (TOF) technology is one of the main technologies in 3D visual imaging technology.

However, in the process of acquiring a depth image by using of a TOF sensor at present, there are often cases where overexposure or underexposure results in poor quality of the acquired depth image, and especially for the presence of both an object with high reflectivity and an object with low reflectivity in the shooting area, in particular, when the object with high reflectivity is in far field and the object with low reflectivity is in far field, automatic exposure can reduce integration time based on the principle of reducing overexposed points to make the object with low reflectivity be under-exposed in a large area, resulting in data loss of the object with low reflectivity and poor image generation quality.

SUMMARY

An objective of the present invention is to provide a method and system for processing an image to improve the image generation quality.

To achieve the objective, in a first aspect, the present invention provides a method for processing an image, the method comprises: acquiring long exposure time data and short exposure time data of a target object, and acquiring initial exposure time to complete the long exposure time data and the short exposure time data; calculating a proportion of overexposed pixel points and a proportion of underexposed pixel points in the short exposure time data; adjusting the initial exposure time according to a magnitude of the proportion of the overexposed pixel points and a magnitude of the proportion of the underexposed pixel points to obtain target exposure time; and acquiring target long exposure time data and target short exposure time data according to the target exposure time, and replacing overexposed pixel points in the target long exposure time data with pixel points of the target short exposure time data.

The method for processing the image provided by an embodiment of the present invention has the beneficial effects that: the initial exposure time is adjusted by calculating the proportion of the overexposed pixel points and the proportion of the underexposed pixel points in the short exposure time data and according to the magnitude of the proportion of the overexposed pixel points and the magnitude of the proportion of the underexposed pixel points to obtain the target exposure time; then the target long exposure time data and the target short exposure time data are acquired according to the target exposure time, and the overexposed pixel points in the target long exposure time data are replaced with the pixel points of the target short exposure time data, thus reducing a condition of pixel information loss caused by underexposure in the shooting, and improving the quality of a picture.

In a possible implementation, adjusting the initial exposure time according to a magnitude of the proportion of the overexposed pixel points and a magnitude of the proportion of the underexposed pixel points to obtain target exposure time comprises: when the proportion of the overexposed pixel point is greater than a first threshold, reducing the initial exposure time to obtain the target exposure time; or when the proportion of the overexposed pixel points is less than or equal to the first threshold and the proportion of the underexposed pixel points is greater than a second threshold, increasing the initial exposure time to obtain the target exposure time. The possible implementation has the beneficial effects that: the initial exposure time is reduced or increased according to a comparison condition of the proportion of the overexposed pixel points and the first threshold value and according to a comparison condition of the proportion of the underexposed pixel points and the second threshold, thus making the target exposure time be more reliable and improving the quality of a depth image.

In a possible implementation, the proportion of the overexposed pixel points satisfies a mathematical expression as follows:

$$\text{ratio\_over} = \text{pixel\_over}/\text{pixel\_all}$$

wherein ratio_over is the proportion of the overexposed pixel points, pixel_over is the overexposed pixel points, and pixel_all is all pixel points;

and the proportion of the underexposed pixel points satisfies a mathematical expression as follows:

$$\text{ratio\_under} = \text{pixel\_under}/\text{pixel\_all}$$

Wherein ratio_under is the proportion of the underexposed pixel points, and pixel_under is the underexposed pixel points. The possible implementation has the beneficial effects that the proportion of the overexposed pixel points and the proportion of the underexposed pixel points are accurately calculated through the mathematical expressions, thus acquiring an overexposure condition and an underexposure condition of the picture.

In a possible implementation, the target exposure time comprises long exposure time and short exposure time, the long exposure time is K times of the short exposure time, a coefficient K satisfying a mathematical expression as follows:

$$K = IR\_thres/IR\_test$$

wherein IR_thres is a preset standard gray value, IR_test is a median in the range of gray values with most proportion of pixel points in the range of gray values of the underexposed pixel points counted using a histogram;

and acquiring the target long exposure time data and the target short exposure time data according to the target exposure time comprises:

acquiring target short exposure data according to the short exposure time, and acquiring target long exposure data according to the long exposure time. The possible implementation has the beneficial effects that the optimal target exposure time is calculated through the method, and the depth image with higher quality may be obtained through the target exposure time.

In a possible implementation, the short exposure time satisfies a mathematical expression as follows:

$$T = IR\_thres * t / IR/\text{mean}$$

wherein T is the short exposure time, t is the initial exposure time, and IR_mean is a mean gray value of the overexposed pixel points or a mean gray value of the underexposed pixel points; when the proportion of the overexposed pixel points is greater than the first threshold, the mean gray value of the overexposed pixel points is adopted for calculating; or when the proportion of the overexposed pixel points is less than or equal to the first threshold, and the proportion of the underexposed pixel points is greater than the second threshold, the mean gray value of the underexposed pixel points is adopted for calculating. The possible implementation has the beneficial effect that the short exposure time is calculated through the method.

In a possible implementation, replacing overexposed pixel points in the target long exposure time data with pixel points of the target short exposure time data comprises: taking the target long exposure data as a depth data main body, and replacing the overexposed pixel points in the target long exposure time data with the target short exposure data to obtain final depth data. The possible implementation has the beneficial effects that the final depth data is obtained, partial loss of data caused by underexposure is avoided, and the quality of the picture is improved.

In a second aspect, an embodiment of the present invention provides a system for processing an image, comprising: an acquisition unit for acquiring long exposure time data and short exposure time data of a target object, and acquiring initial exposure time to complete the long exposure time data and the short exposure time data; a calculating unit for calculating a proportion of overexposed pixel points and a proportion of underexposed pixel points in the short exposure time data; an adjusting unit for adjusting the initial exposure time according a magnitude of the proportion of the overexposed pixel points and a magnitude of the proportion of the underexposed pixel points to obtain target exposure time; and a processing unit for acquiring target long exposure time data and target short exposure time data according to the target exposure time, and replacing overexposed pixel points in the target long exposure time data with pixel points of the target short exposure time data.

The system for processing the image provided by the embodiment of the present invention has the beneficial effects that the initial exposure time is adjusted by calculating the proportion of the overexposed pixel points and the proportion of the underexposed pixel points in the short exposure time data and according to the magnitude of the proportion of the overexposed pixel points and the magnitude of the proportion of the underexposed pixel points to obtain the target exposure time; then the target long exposure time data and the target short exposure time data are acquired according to the target exposure time, and the overexposed pixel points in the target long exposure time data are replaced with the pixel points of the target short exposure time data, thus reducing a condition of pixel information loss caused by underexposure or overexposure in the shooting, and improving the quality of a picture.

In a possible implementation, the adjusting unit is further used for reducing the initial exposure time when judging that the proportion of the overexposed pixel points is greater than a first threshold, or increasing the initial exposure time when the proportion of the overexposed pixel points is less than or equal to the first threshold and the proportion of the underexposed pixel points is greater than a second threshold. The possible implementation has the beneficial effects that the initial exposure time is reduced and increased according to actual magnitudes of the calculated proportion of the underexposed pixel points and the calculated proportion of the overexposed pixel points, thus making the obtained target exposure time be more reliable.

In a possible implementation, the proportion of the overexposed pixel points satisfies a mathematic expression as follows: ratio_over=pixel_over/pixel_all, wherein ratio_over is the proportion of the overexposed pixel points, pixelover is the overexposed pixel points, pixel_all is all pixel points, and the proportion of the underexposed pixel points satisfies a mathematic expression as follows:

$$ratio\_under=pixel\_under/pixel\_all$$

wherein ratio_under is the proportion of the underexposed pixel points, and pixel_under is the underexposed pixel points.

In a possible implementation, the target exposure time comprises long exposure time and short exposure time, the long exposure time is K times of the short exposure time, a coefficient K satisfying a mathematic expression as follows:

$$K=IR\_thres/IR\_test$$

wherein IR_thres is a preset standard gray value, IR_test is a median in the range of gray values with most proportion of pixel points in the range of gray values of the underexposed pixel points counted using a histogram; and acquiring the target long exposure time data and the target short exposure time data according to the target exposure time comprises: acquiring target short exposure data according to the short exposure time, and acquiring target long exposure data according to the long exposure time.

In a possible implementation, the short exposure time satisfies a mathematical expression as follows:

$$T=IR\_thres+t/IR\_mean$$

wherein T is the short exposure time, t is the initial exposure time, IR_mean is a mean gray value of the overexposed pixel points or a mean gray value of the underexposed pixel points; when the proportion of the overexposed pixel points is greater than the first threshold, the mean gray value of the overexposed pixel points is adopted for calculating; or when the proportion of the overexposed pixel points is less than or equal to the first threshold, and the proportion of the underexposed pixel points is greater than the second threshold, the mean gray value of the underexposed pixel points is adopted for calculating.

In a possible implementation, the processing unit is further used for taking the target high-frame depth as a depth data main body, the target short exposure data is used for replacing the overexposed pixel points in the target long exposure time data to obtain final depth data.

DESCRIPTION OF THE EMBODIMENTS

In order to make objectives, technical solutions, and advantages of the present invention clearer, the technical solutions in the present invention are described clearly and completely in the following with reference to accompanying drawings in the embodiments of the present invention. Apparently, the described embodiments are only part rather than all of the embodiments of the present invention. Based on the embodiments of the present invention, all the other embodiments obtained by those of ordinary skill in the art without creative efforts are within the scope of the present invention. Unless otherwise mentioned, all technical and scientific terms used herein have the same meaning as commonly understood by one of ordinary skill in the art to which the present invention belongs. As used herein, "comprising" and like words mean that elements or items appearing before the word encompass elements or items listed after the word and equivalents thereof, but do not exclude other elements or items.

Figure 1:
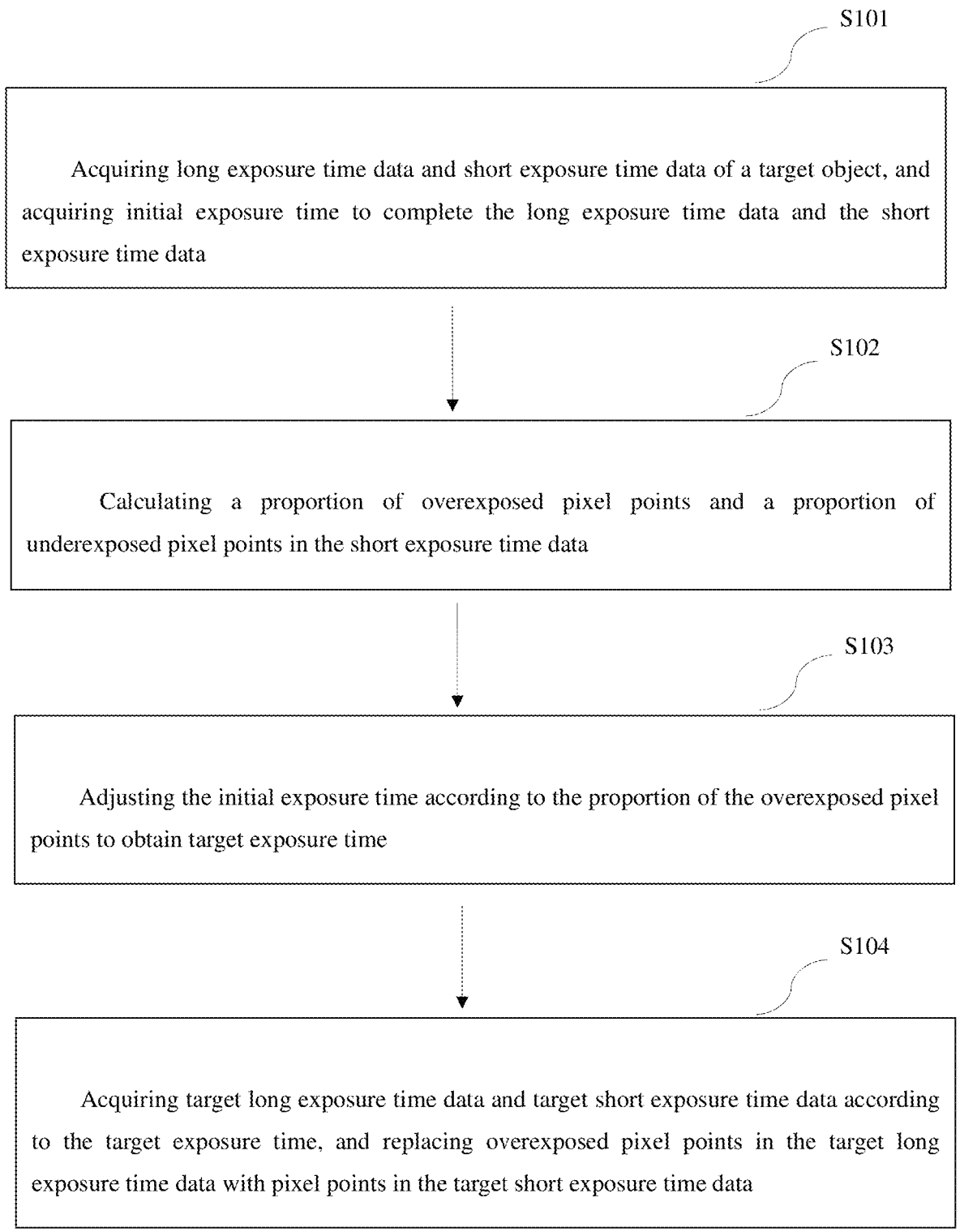
FIG. 1 is a flow diagram of a method for processing an image in accordance with an embodiment of the present invention.

For an existing problem, an embodiment of the present invention provides a method for processing an image, referring to FIG. 1, the method comprises:

S101: acquiring long exposure time data and short exposure time data of a target object, and acquiring initial exposure time to complete the long exposure time data and the short exposure time data; and S102: calculating a proportion of overexposed pixel points and a proportion of underexposed pixel points in the short exposure time data.

In the steps, the proportion of the overexposed pixel points is obtained by calculating through a mathematic expression ratio_over=pixel_over/pixel_all, and the proportion of the underexposed pixel points satisfies a mathematic expression as follows: ratio_under=pixel_under/pixel_all, wherein ratio_over is the proportion of the overexposed pixel points, pixel_over is the overexposed pixel points, pixel_all is all pixel points, ratio_under is the proportion of the underexposed pixel points, and pixel_under is the underexposed pixel points. It should be noted that a TOF shooting terminal counts all pixel points and overexposed pixel points in a shot target object, and then calculates the proportion of the overexposed pixel points and the proportion of the underexposed pixel points, thus facilitating the subsequent application. It should be noted that the long exposure time data is long exposure time data, and the short exposure time data is short exposure time data.

S103: adjusting the initial exposure time according to a magnitude of the proportion of the overexposed pixel points and a magnitude of the proportion of the underexposed pixel points to obtain target exposure time.

In the step, the initial exposure time is adjusted according to the magnitude of the proportion of the overexposed pixel points and the magnitude of the proportion of the underexposed pixel points to obtain the target exposure time.

Specifically, a first threshold and a second threshold are preset at the TOF shooting terminal, the proportion of the overexposed pixel points is compared with the first threshold, and when the proportion of the overexposed pixel points is greater than the first threshold, the initial exposure time is reduced to the target exposure time; or when the proportion of the overexposed pixel points is less than or equal to the first threshold and the proportion of the underexposed pixel points is greater than the second threshold, the initial exposure time is increased to obtain the target exposure time.

In the embodiment, the target exposure time comprises long exposure time and short exposure time, and the long exposure time is K times of the short exposure time, a coefficient K satisfying a mathematic expression as follows: K=IR_thres/IR_test wherein IR_thres is a preset standard gray value, IR_test is a median in the range of gray values with most proportion of pixel points in the range of gray values of the underexposed pixel points counted using a histogram; in the histogram, an abscissa is used for distinguishing different gray value ranges, such as 0-10, 11-20, 21-30 and the like, and an ordinate represents the number of corresponding pixel points in the gray value range. In brief, the number of the pixel points corresponding to the range of the gray values in all underexposed pixel points is counted using the histogram, the abscissa in the histogram is used for distinguishing different magnitudes of the gray values, and the ordinate in the histogram represents the number of the pixel points in the gray value range, and thus the number of the corresponding pixel points in different underexposed gray value ranges may be counted through the histogram.

It should be noted that the short exposure time satisfies a mathematic expression as follows: T=IR_thres*t/IR_mean, wherein T is the short exposure time, t is the initial exposure time, IR_mean is a mean gray value of the overexposed pixel points or a mean gray value of the underexposed pixel points; when the proportion of the overexposed pixel points is greater than the first threshold, the TOF shooting terminal calculates the mean gray value of the overexposed pixel points, and calculates the T by adopting the mean gray value of the overexposed pixel points; or when the proportion of the overexposed pixel points is less than or equal to the first threshold and the proportion of the underexposed pixel points is greater than the second threshold, the TOF shooting terminal calculates the mean gray value of the underexposed points, and calculates the T by adopting the mean gray value of the underexposed pixel points.

S104: acquiring target long exposure time data and target short exposure time data according to the target exposure time, and replacing overexposed pixel points in the target long exposure time data with pixel points of the target short exposure time data.

In the step, the target short exposure data is acquired according to the target exposure time, specifically, the target short exposure data is acquired according to the short exposure time, and the target long exposure data is acquired according to the long exposure time. The target long exposure data is ultimately taken as a main body of the depth data, the target short exposure data is used for replacing the overexposed pixel points in the target long exposure time data to obtain final depth data, and an image obtained through the final depth data is prevented from loss of pixel point data caused by underexposure, and the quality and integrity of image formation are improved.

In the embodiment, the initial exposure time is adjusted by calculating the proportion of the overexposed pixel points and the proportion of the underexposed pixel points in the short exposure time data and according to the magnitude of the proportion of the overexposed pixel points and the magnitude of the proportion of the underexposed pixel points to obtain the target exposure time; then the target long exposure time data and the target short exposure time data are acquired according to the target exposure time, and the overexposed pixel points in the target long exposure time data are replaced with the pixel points of the target short exposure time data, thus reducing a condition of pixel information loss caused by underexposure in the shooting, and improving the quality of a picture.

Figure 2:
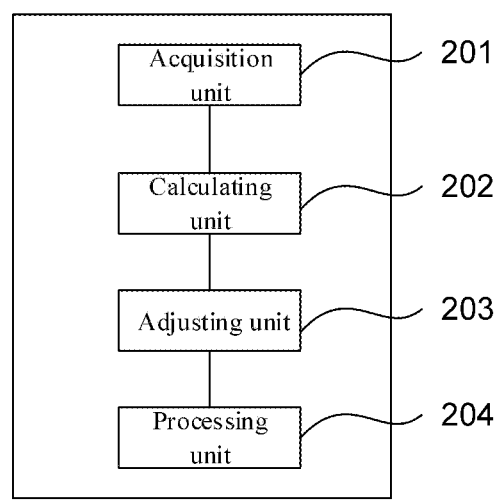
FIG. 2 is a structure diagram of a system for processing an image in accordance with an embodiment of the present invention.

In another embodiment disclosed by the present invention, a system for processing an image is provided, referring to FIG. 2, the system comprises an acquisition unit 201, a calculating unit 202, an adjusting unit 203, and a processing unit 204. The acquisition unit 201 is used for acquiring long exposure time data and short exposure time data of a target object, and acquiring initial exposure time to complete the long exposure time data and the short exposure time data;

the calculating unit 202 is used for calculating a proportion of overexposed pixel points and a proportion of underexposed pixel points in the short exposure time data; an adjusting unit 203 is used for adjusting the initial exposure time according a magnitude of the proportion of the overexposed pixel points and a magnitude of the proportion of the underexposed pixel points to obtain target exposure time; and a processing unit 204 is used for acquiring target long exposure time data and target short exposure time data according to the target exposure time, and replacing overexposed pixel points in the target long exposure time data with pixel points of the target short exposure time data.

In the embodiment, the calculating unit 202 is used for calculating the proportion of the overexposed pixel points and the proportion of the underexposed pixel points in the short exposure time data; the adjusting unit 203 is used for adjusting the initial exposure time according to the proportion of the overexposed pixel points and the proportion of the underexposed pixel points to obtain the target exposure time; then the processing unit 204 is used for acquiring the target long exposure time data and the target short exposure time data according to the target exposure time, and replacing the overexposed pixel points in the target long exposure time data with the pixel points of the target short exposure time data, thus reducing a condition of pixel information loss caused by underexposure in the shooting, and improving the quality of a picture.

In a possible implementation, the adjusting unit 203 is further used for reducing the initial exposure time when judging that the proportion of the overexposed pixel points is greater than a first threshold; or increasing the initial exposure time when the proportion of the overexposed pixel points is less than or equal to the first threshold and the proportion of the underexposed pixel points is greater than a second threshold, thus adjusting the initial exposure time according to an actual condition, and making the target exposure time be more reliable. The proportion of the overexposed pixel points satisfies a mathematic expression as follows: ratio_over=pixel_over/pixel_all, and the proportion of the underexposed pixel points satisfies a mathematic expression as follows: ratio_under=pixel_under/pixel_all, wherein ratio_over represents the proportion of the overexposed pixel points, pixel_over represents the overexposed pixel points, ratio under is the proportion of the underexposed pixel points, pixel under is the underexposed pixel points, and pixel_all represents all pixel points.

In a possible implementation, the target exposure time comprises long exposure time and short exposure time, and the long exposure time is K times of the short exposure time, a coefficient K satisfying a mathematic expression as follows: K=IR_thres/IR_test, wherein IR_test is a median in the range of gray values with most proportion of pixel points in the range of gray values of the underexposed pixel points counted using a histogram. In the embodiment, the processing unit 204 is used for acquiring target short exposure data according to the short exposure time, and acquiring target long exposure data according to the long exposure time. The processing unit 204 is further used for taking the target long exposure data as a depth data main body, replacing the overexposed pixel points in the target long exposure time data with the pixel points of the target short exposure data to obtain final depth data. Thus, the condition of pixel information loss caused by underexposure in the shooting is reduced, and the quality of the picture is improved.

Certainly, the processing unit may count the number of the overexposed pixel points and all pixels, and then the number is calculated by the calculating unit, when the proportion of the overexposed pixel points is greater than the first threshold, a mean gray value of the overexposed pixel points is calculated, and when the proportion of the overexposed pixel points is less than or equal to the first threshold, a mean gray value of the underexposed pixel points is calculated; the short exposure time satisfies a mathematic expression as follows: T=IR_thres*t/IR_mean, wherein T is the short exposure time, t is the initial exposure time, IR_thres is a preset standard gray value, IR_mean is the mean gray value of the overexposed pixel points or the mean gray value of the underexposed pixel points, and the optimal short exposure time is calculated through the method.

The above embodiments are only specific embodiments of the embodiments of the present application, however, the scope of protection of the embodiments of the present application is not limited thereto, and any variations or substitutions within the technical scope disclosed by the embodiments of the present application should be covered within the scope of protection of the embodiments of the present application. Therefore, the scope of protection of the embodiments of the present application should be subjected to the scope of protection of the claims.

What is claimed is:

1. A method for processing an image, being applied to a TOF (Time of Flight) shooting terminal, the method comprising:

acquiring long exposure time data and short exposure time data of a target object, and acquiring initial exposure time to complete the long exposure time data and the short exposure time data;

calculating a proportion of overexposed pixel points and a proportion of underexposed pixel points in the short exposure time data;

adjusting the initial exposure time according to a magnitude of the proportion of the overexposed pixel points and a magnitude of the proportion of the underexposed pixel points to obtain target exposure time; and acquiring target long exposure time data and target short exposure time data according to the target exposure time, and replacing overexposed pixel points in the target long exposure time data with pixel points of the target short exposure time data, wherein the adjusting the initial exposure time according the magnitude of the proportion of the overexposed pixel points and the magnitude of the proportion of the underexposed pixel points comprises:

when the proportion of the overexposed pixel points is greater than a first threshold, reducing the initial exposure time; or when the proportion of the overexposed pixel points is less than or equal to the first threshold and the proportion of the underexposed pixel points is greater than a second threshold, increasing the initial exposure time.

2. The method according to claim 1, wherein the proportion of the overexposed pixel points satisfies a mathematical expression as follows:

ratio_over=pixel_over/pixel_all wherein ratio_over is the proportion of the overexposed pixel points, pixel_over is the overexposed pixel points, and pixel_all is all pixel points;

and the proportion of the underexposed pixel points satisfies a mathematical expression as follows:

ratio_under=pixel_under/pixel_all wherein ratio_under is the proportion of the underexposed pixel points, and pixel_under is the underexposed pixel points.

3. The method according to claim 2, wherein the target exposure time comprises long exposure time and short exposure time, the long exposure time is K times of the short exposure time, a coefficient K satisfying a mathematical expression:

$K=IR\_thres/IR\_test$ wherein IR_thres is a preset standard gray value, IR_test is a median in the range of gray values with most proportion of pixel points in the range of gray values of the underexposed pixel points counted using a histogram;

and the acquiring the target long exposure time data and the target short exposure time data according to the target exposure time comprises:

acquiring target short exposure data according to the short exposure time, and acquiring target long exposure data according to the long exposure time.

4. The method according to claim 3, wherein the short exposure time satisfies a mathematical expression as follows:

$T=IR\_thres*t/IR\_mean$ wherein T is the short exposure time, t is the initial exposure time, IR_mean is a mean gray value of the overexposed pixel points or a mean gray value of the underexposed pixel points, when the proportion of the overexposed pixel points is greater than the first threshold, the mean gray value of the overexposed pixel points is adopted for calculating; or when the proportion of the overexposed pixel points is less than or equal to the first threshold, and the proportion of the underexposed pixel points is greater than the second threshold, the mean gray value of the underexposed pixel points is adopted for calculating.

5. The method according to claim 4, wherein the replacing the overexposed pixel points in the target long exposure time data with the pixel points of the target short exposure time data comprises:

taking the target long exposure data as a depth data main body, and replacing the overexposed pixel points in the target long exposure time data with the target short exposure data to obtain final depth data.

* * * * *